United States Patent
Mori

[11] 3,728,011
[45] Apr. 17, 1973

[54] RETROFOCUS TYPE ULTRA-WIDE ANGLE LENS

[75] Inventor: Ikuo Mori, Kawasaki, Japan
[73] Assignee: Nippon Kogaku K.K., Tokyo, Japan
[22] Filed: Mar. 21, 1972
[21] Appl. No.: 236,716

[30] Foreign Application Priority Data

Mar. 26, 1971  Japan ........................ 46/17297

[52] U.S. Cl. ............... 350/214, 350/176, 350/177, 350/196
[51] Int. Cl. ..................... G02b 9/64, G02b 13/04
[58] Field of Search ................. 350/214, 176, 177, 350/198

[56] References Cited

UNITED STATES PATENTS 3,524,697   8/1970   Isshiki et al. ................... 350/198 UX Primary Examiner—John K. Corbin
Attorney—Joseph M. Fitzpatrick et al.

[57] ABSTRACT

A retrofocus type ultra-wide angle lens, having 13 air-spaced elements in four groups, which include, as viewed from the object side of the lens, a first group consisting of two divergent meniscus elements and a convergent meniscus element, a second group consisting of three divergent meniscus elements and a convergent cemented component, a third group consisting of a divergent meniscus element and a positive cemented component, and a fourth group consisting of a convergent element, a divergent element, a convergent meniscus element and a cemented component. A diaphragm is disposed immediately behind the third group.

2 Claims, 7 Drawing Figures

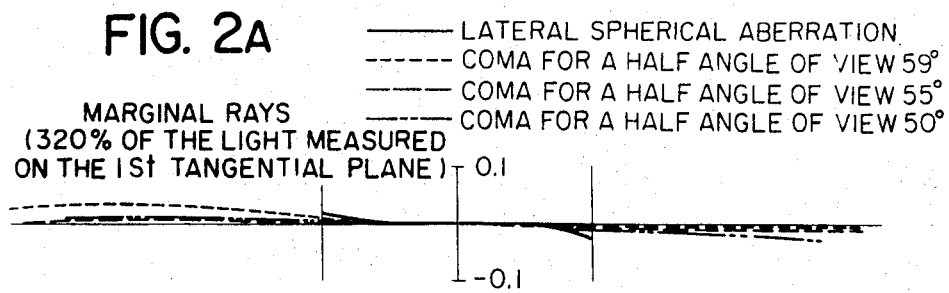
FIG. 2A
——— LATERAL SPHERICAL ABERRATION
----- COMA FOR A HALF ANGLE OF VIEW 59°
—·— COMA FOR A HALF ANGLE OF VIEW 55°
—··— COMA FOR A HALF ANGLE OF VIEW 50°
MARGINAL RAYS
(320% OF THE LIGHT MEASURED
ON THE 1st TANGENTIAL PLANE)
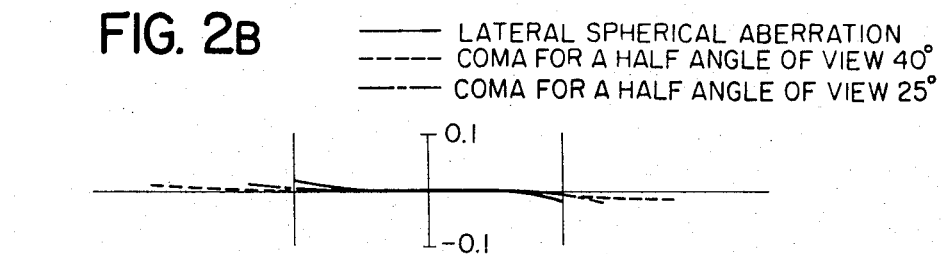
FIG. 2B
——— LATERAL SPHERICAL ABERRATION
----- COMA FOR A HALF ANGLE OF VIEW 40°
—·— COMA FOR A HALF ANGLE OF VIEW 25°
FIG. 2C   FIG. 2D   FIG. 2E
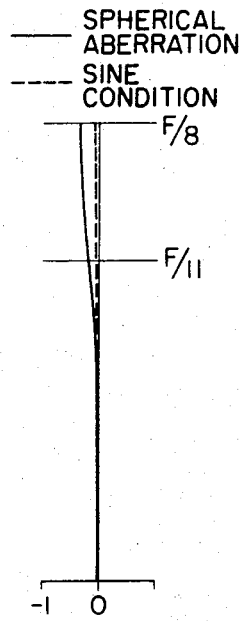
——— SPHERICAL ABERRATION
----- SINE CONDITION
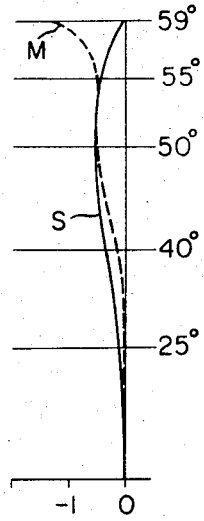
ASTIGMATISM
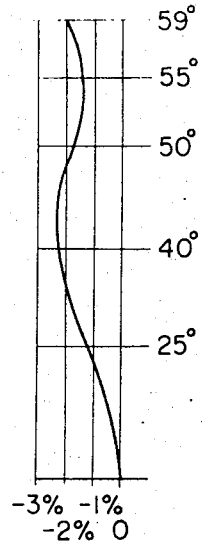
DISTORTION

RETROFOCUS TYPE ULTRA-WIDE ANGLE LENS

BACKGROUND OF THE INVENTION

1. Field of the Invention

This invention relates to a retrofocus type ultra-wide angle lens which has 13 elements (not including the filter) in four groups and separated from one another by air space, and which can provide a back-focus (hereinafter referred to as B.f.) of not less than 37.5 mm, a relative aperture of at least F/8 and an angle of view of 118° for the total focal length $f=13.2$ mm.

2. Description of the Prior Art

In a lens of short focal length having a wide angle of view, such as the lens to which the present invention relates, it is very difficult to obtain a predetermined B.f. and even more difficult to obtain the proper quantity of marginal or peripheral light. For example, when the angle of view is 118°, the actual quantity of marginal light is only 7 percent due to the cosine biquadratic rule, even when a quantity of light amounting to 100 percent of the lens aperture is introduced, as measured on the first tangential plane. In view of the fact that the value of such marginal light should usually be at least about 20 percent in photographic lenses of the type to which the present invention relates, a very great quantity of light, such as more than 300 percent of the lens aperture as measured on the first tangential plane, must be provided. To achieve this, there is an additional requisite, i.e. the coma in the marginal area of the lens must be well corrected. This necessarily requires that the relative aperture of the lens be reduced to a certain degree, with respect to the limitations existing in the correction of the coma in the marginal lens area. On the other hand, when the matter is considered from another viewpoint, i.e. from the viewpoint of aberration, the large angle of view necessarily leads to the creation of large distortions and astigmatism. Taking distortion, for example, a curvature of distortion is already present in a similar wide-angle lens whose angle of view is about 80°, and from this fact it is evident that the curvature of distortion will be even greater in lenses having an extremely large angle of view, such as the lens to which the present invention relates. This also holds true for astigmatism, and, therefore, the curvature of astigmatism must be absolutely prevented, in order to introduce a great deal of marginal light, because the coma in the marginal region of the lens tends to be attracted to the meridional plane. Accordingly, the meridional plane must be more under-corrected in the outermost marginal area than in any other part of the view field. The present invention has been made in view of the problems noted above.

SUMMARY OF THE INVENTION

It is an object of the present invention to provide a retrofocus type ultra-wide angle lens system which comprises thirteen air-spaced elements in four groups. The four groups include, as viewed from the object side of the system, a first group consisting of two divergent meniscus elements and a convergent meniscus element, a second group consisting of three divergent meniscus elements and a convergent composite component, a third group consisting of a divergent meniscus element and a positive composite component, said third group being immediately followed by a diaphragm, and a fourth group consisting of a convergent element, a divergent element, a convergent meniscus element and a composite component. The lens system satisfies the relations:

$$1.2R_2 < R_1 < 2R_2$$

$$1.2R_4 < R_3 < 2R_4$$

$$3R_5 < R_6 < 5R_5$$

$$5R_7 < R_6 < 8R_7$$

where $R$ represents the radius of curvature of each element.

The lens system according to the present invention further satisfies the relations:

$$1.2R_8 < R_7 < 2R_8$$

$$1.2R_{10} < R_9 < 2R_{10}$$

$$1.2R_{12} < R_{11} < 2R_{12}$$

$$n_7 > n_8, d_{14} > d_{13}$$

where $n$ represents the refractive index of each element and $d$ the inter-vertex distance of each element.

The lens system of the present invention further satisfies the relations:

$$R_{19} < 0.6R_{18}$$

$$\gamma d_{10} < \gamma d_{11}$$

where $d$ represents the dispersive power of each element.

The lens system further satisfies the relations:

$$d_{29} + d_{30} > d_{23}, d_{25} \text{ or } d_{27}.$$

BRIEF DESCRIPTION OF THE DRAWINGS

The invention will become fully apparent from the following detailed description of an embodiment thereof when taken in conjunction with the accompanying drawings, in which:

FIGS. 2A – 2E graphically illustrate various aberrations in the lens system of FIG. 1 for its focal length $f = 13.2$ mm.

DESCRIPTION OF THE PREFERRED EMBODIMENT

Figure 1:
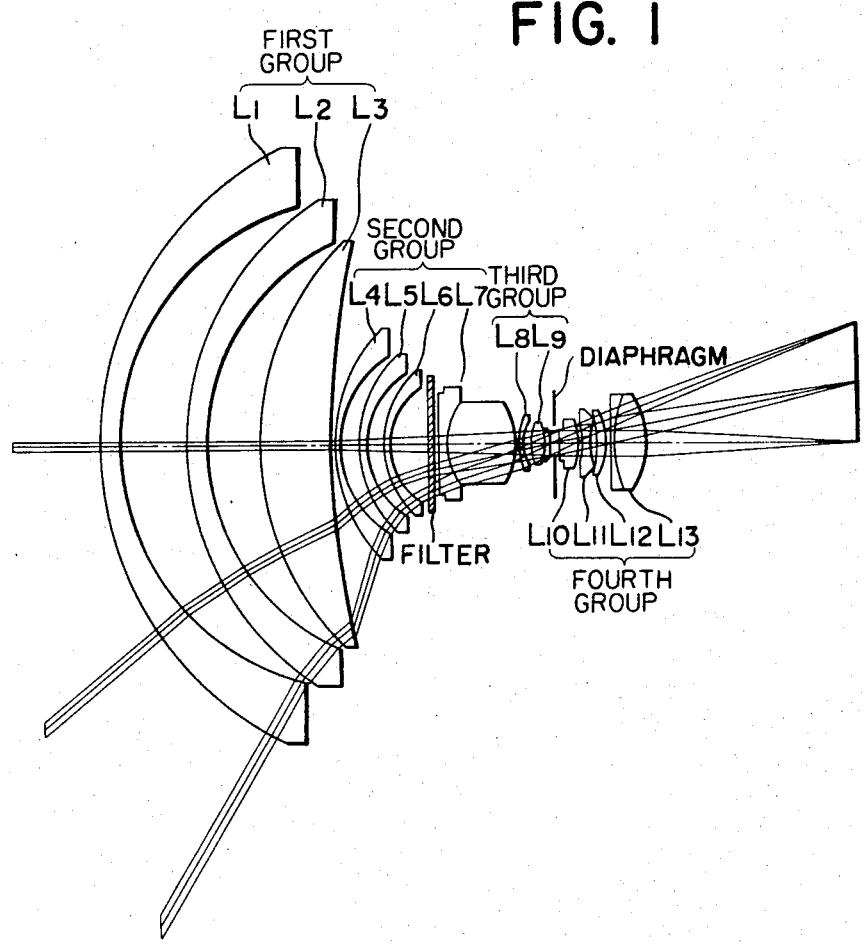
FIG. 1 is a longitudinal sectional view of the lens system according to one embodiment of the present invention.

Referring to FIG. 1, there is shown a lens system according to the present invention whose arrangement and characteristics will be described hereinafter, except for the filter.

A first group, generally designated by A, consists of three meniscus elements $L_1$, $L_2$ and $L_3$. The elements $L_1$ and $L_2$ are divergent lenses and the element $L_3$ is a convergent lens. The respective elements are characterized by the following radii of curvature R.

$$1.2R_2 < R_1 < 2R_2 \qquad (1)$$

$$1.2R_4 < R_3 < 2R_4 \qquad (2)$$

$$3R_5 < R_6 < 5 < 5 \qquad (3)$$

where the subscripts attached to $R$ represent the order of the successive lens surfaces as viewed from the object side of the system. Further, in order to avoid an extremely large air space between the marginal areas of elements $L_3$ and $L_4$, the radii of curvature $R_6$ and $R_7$ of elements $L_3$ and $L_4$ are selected to satisfy the relation:

$$5R_7 < R_6 < 8 R_7 \qquad (4)$$

A second group, generally designated by B, consists of four elements $L_4$, $L_5$, $L_6$ and $L_7$. The elements $L_4$, $L_5$ and $L_6$ are meniscus divergent lenses and the element $L_7$ is a composite convergent lens. A filter may be interposed between the elements $L_6$ and $L_7$. The elements forming the second group are characterized, as follows:

$$1.2R_8 < R_7 < 2R_8 \qquad (5)$$

$$1.2R_{10} < R_9 < 2R_{10} \qquad (6)$$

$$1.2R_{12} < R_{11} < 2R_{12} \qquad (7)$$

$$n_7 > n_8, d_{14} > d_{13} \qquad (8)$$

where $n$ and $d$ respectively represent the refractive indices and intervertex distances of the respective elements.

A third group, generally designated by C, consists of two elements $L_8$ and $L_9$, $L_8$ being a meniscus divergent lens and $L_9$ being a composite convergent lens. These two elements are characterized as follows:

$$R_{19} < 0.6R_{18} \qquad (9)$$

$$\gamma d_{10} < \gamma d_{11} \qquad (10)$$

where $\gamma d$ represents the dispersive power of each element.

A fourth group, generally designated by D, consists of four elements, $L_{10}$ being a convergent lens, $L_{11}$ being a divergent lens, $L_{12}$ being a meniscus convergent lens and $L_{13}$ being a composite lens. The element $L_{13}$ is characterized as follows:

$$d_{29} + d_{30} > d_{23}, d_{25} \text{ or } d_{27} \qquad (11)$$

A diaphragm is interposed between the third group C and the fourth group D.

The arrangement and characteristics described above lead to excellent correction of various aberrations, particularly distortion, astigmatism, coma, etc.

These characteristics will now be described in greater detail.

Generally, in the retrofocus type of wide-angle lens, a member of positive refractive power, as means for the correction of distortion, is disposed in the divergent group to thereby correct any negative distortion. Undeniably, however, such a member has the effect of creating an over-correction or curvature of distortion in the area near the margin of the view field. Moreover, such a phenomenon is naturally more pronounced as the angle of view is increased. Hence, the refractive power of the positive member must be minimized in order to reduce the curvature of the distortion as much as possible when using a wide-angle lens. For this purpose, the lens system of the present invention employs two meniscus divergent elements $L_1$ and $L_2$ having relatively large convexities or relatively small refractive indices, as specified in conditions (1) and (2) above, respectively. At the same time, the respective convex surfaces of these two elements have such curvatures that all oblique rays incident thereon are made vertical thereto, and this, together with the characteristics, as specified in conditions (1) and (2), serves to reduce the negative distortion created in these two elements. Therefore, such distortion that does exist can be duly corrected by the subsequent positive member $L_3$, even if this member has a reduced refractive power. However, the curvature of distortion could not be reduced simply by reducing the refractive power, and therefore, it is necessary that the element $L_3$ be a meniscus lens of great curvature whose concave surface has a smaller curvature than its convex surface, as seen in condition (3) above. In addition, the element $L_3$ is provided with a characteristic, as specified in condition (4), so that the intervertex air space between the element $L_3$ and the subsequent $L_4$ is not extremely larger than the marginal air space between these two elements. This ensures that the marginal rays will not be extremely refracted in the element $L_3$ and that the marginal air space or the length of the optical path, as measured by an oblique light beam, will not be increased, thus achieving a generally less curved correction without causing substantially great over-correction of the distortion in the marginal area.

By arranging the elements of the first group A in the manner described above, it has been found that distortion can be corrected while the curvature thereof if minimized. On the other hand, however, the relatively reduced radius of curvature $R_6$ of the element $L_3$ gives birth to a disadvantage because it affects the astigmatism, especially the meridional plane, to cause over-correction in the marginal area of the view field and under-correction in the vicinity of 80 percent of the view field. Since the meridional plane in the marginal area is closely related to the coma as described previously, the meridional plane in this area must as far as possible be kept in a more under-corrected condition than any other point in the view field. The purpose of such correction is, of course, to improve the coma in the marginal area and to introduce as much marginal light as possible. Consequently, according to the present invention, the element $L_3$ is immediately followed by the second Group B consisting of three divergent meniscus lenses of relatively great convexities, which satisfy conditions (5), (6) and (7) above. This reduces the negative refractive powers of these elements to thereby compensate for the disadvantage resulting from the radius of curvature $R_6$ of the element $L_3$, i.e. the curvature of the meridional plane, and at the same time it is useful to prevent the occurrence of distortion. The forward portion of the second group is designated in this way, while the rearward portion of the same group includes the positive component $L_7$, which removes the distortion occurring in the forward portion and which is a composite lens satisfying condition (8) above. The joint interface of element $L_7$ is provided with a diverging function to secure a B.f.

In the third group C, the forward portion thereof comprises the divergent meniscus element $L_8$ having a relatively great refractive power according to condition (9) above, thereby securing a predetermined B.f. for the lens system of the present invention. The element $L_8$ is followed by the positive element $L_9$ which corrects the negative distortion and positive spherical aberration caused by the preceding element $L_8$. The component $L_9$ comprises joined elements formed of glass materials of different dispersive power, as given by condition (10), so as to correct the chromatic aberrations on and off the axis.

A common feature of all of the described groups preceding the diaphragm is that each of these groups is followed by a convergent element. This is intended to correct the distortion caused by the divergent elements in each group, and is highly effective for removing the curvature of distortion.

Condition (11) is imposed on the fourth group D, i.e. the group disposed rearwardly of the diaphragm, to satisfactorily compensate for the breach of the sine condition which may often arise in a retrofocus type lens, as well as to correct the closely related coma in the intermediate and inner areas of the view field.

Among the various conditions enumerated above, conditions (1) and (2) are intended to minimize the possible distortion, but when the upper limits of these conditions are exceeded there will occur a great negative distortion. Such distortion, however, could be corrected readily and simply by increasing the refractive power of the element $L_3$. This would, on the other hand, result in an increased curvature of distortion, which is incompatible with the primary object of the present invention of providing a lens directed to the least curved correction of distortion. When the lower limits of the conditions (1) and (2) are exceeded, no B.f. will be attained and, at the same time, the meridional plane at the portion near the margin of the view field will be subject to such an extreme under-correction that it could never be compensated for.

When the upper limits of conditions (3) and (4) are exceeded, it is apparent that the positive refractive power will be increased to cause an over-corrected distortion in the marginal area, thus failing to attain less curved correction of distortion. When the lower limits of these conditions are exceeded, there will be extreme under-correction of the distortion, which could never be compensated for by any other lens surface.

Among the conditions imposed on the second group B, those indicated by (5), (6) and (7) are based on the same concept as the conditions (1) and (2), and accordingly, they are similar in effect. When the condition (8) is not satisfied, considerable difficulties would be encountered in securing a predetermined B.f.

If the condition (9), imposed on the third group C, should not be satisfied, difficulties will likewise be encountered in obtaining the B.f. When the condition (10) is not met, poor correction of chromatic aberration would be obtained. Also, when the condition (11) for the fourth group D is not satisfied, the breach of the sine condition could not be removed.

An example of the present invention and the Seidel coefficients therein are shown in the table below, where $R$ represents the radius of curvature of each lens surface, $d$ the intervertex distance between adjacent lenses, $n$ the refractive index of each lens, and $\gamma d$ the Abbe number of each lens.

Seidel Coefficients

| | I | II | III | IV | V |
|---|---|---|---|---|---|
| $R_1$ | 0.003 | 0.002 | 0.106 | 0.102 | 0.078 |
| $R_2$ | −0.013 | 0.006 | −0.142 | −0.136 | 0.062 |
| $R_3$ | 0.010 | 0.006 | 0.122 | 0.114 | 0.072 |
| $R_4$ | −0.036 | 0.008 | −0.154 | −0.151 | 0.032 |
| $R_5$ | 0.027 | 0.015 | 0.140 | 0.124 | 0.067 |
| $R_6$ | 0.000 | 0.000 | 0.012 | −0.016 | −0.654 |
| $R_7$ | 0.015 | 0.017 | 0.256 | 0.216 | 0.247 |
| $R_8$ | −0.235 | 0.001 | −0.317 | −0.317 | 0.002 |
| $R_9$ | 0.154 | 0.059 | 0.317 | 0.271 | 0.105 |
| $R_{10}$ | −1.266 | 0.219 | −0.537 | −0.461 | 0.080 |
| $R_{11}$ | 0.996 | 0.042 | 0.322 | 0.319 | 0.014 |
| $R_{12}$ | −3.522 | 0.525 | −0.700 | −0.543 | 0.081 |
| $R_{13}$ | 0.348 | 0.207 | 0.372 | 0.124 | 0.074 |
| $R_{14}$ | −0.359 | −0.214 | −0.383 | −0.128 | −0.076 |
| $R_{15}$ | 0.544 | 0.290 | 0.481 | 0.172 | 0.092 |
| $R_{16}$ | −8.272 | 0.523 | −0.214 | −0.147 | 0.009 |
| $R_{17}$ | 3.030 | −0.870 | 1.042 | 0.543 | −0.156 |
| $R_{18}$ | 5.284 | 0.781 | 0.666 | 0.434 | 0.064 |
| $R_{19}$ | −178.546 | −3.209 | −0.901 | −0.785 | −0.014 |
| $R_{20}$ | 95.728 | 4.919 | 1.172 | 0.667 | 0.034 |
| $R_{21}$ | −1.086 | 0.083 | −0.024 | −0.011 | 0.001 |
| $R_{22}$ | −0.001 | −0.004 | −0.061 | 0.020 | −0.091 |
| $R_{23}$ | 0.001 | 0.004 | 0.061 | 0.020 | 0.091 |
| $R_{24}$ | 133.161 | −4.474 | 0.920 | 0.619 | −0.021 |
| $R_{25}$ | −97.567 | 4.097 | −0.982 | −0.638 | 0.027 |
| $R_{26}$ | −11.793 | −2.871 | −2.269 | −0.871 | −0.212 |
| $R_{27}$ | 0.101 | 0.133 | 0.431 | 0.078 | 0.103 |
| $R_{28}$ | 41.192 | −0.390 | 0.435 | 0.428 | −0.004 |
| $R_{29}$ | −0.008 | 0.018 | −0.119 | −0.035 | 0.082 |
| $R_{30}$ | −1.863 | −0.494 | −0.451 | −0.189 | −0.050 |
| $R_{31}$ | 38.783 | 0.846 | 0.346 | 0.309 | 0.007 |
| Σ | 14.810 | 0.275 | −0.053 | 0.092 | 0.146 |

Example

Focal length $f = 13.2$mm, Relative Aperture $F/8$ Angle of view 118°

| | | | |
|---|---|---|---|
| $R_1 = 57.2$ | $d_1 = 3.9$ | $n_1 = 1.77279$ | $\gamma d_1 = 49.5$ |
| $R_2 = 43.0$ | $d_2 = 11.9$ | | |
| $R_3 = 51.0$ | $d_3 = 3.0$ | $n_2 = 1.7335$ | $\gamma d_2 = 51.0$ |
| $R_4 = 37.5$ | $d_4 = 9.3$ | | |
| $R_5 = 48.2$ | $d_5 = 13.5$ | $n_3 = 1.732$ | $\gamma d_3 = 53.7$ |
| $R_6 = 190.0$ | $d_6 = 0.1$ | | |
| $R_7 = 28.5$ | $d_7 = 1.2$ | $n_4 = 1.7335$ | $\gamma d_4 = 51.0$ |
| $R_8 = 17.6$ | $d_8 = 3.3$ | | |
| $R_9 = 22.5$ | $d_9 = 1.0$ | $n_5 = 1.7320$ | $\gamma d_5 = 53.7$ |
| $R_{10} = 13.2$ | $d_{10} = 3.0$ | | |
| $R_{11} = 17.6$ | $d_{11} = 1.0$ | $n_6 = 1.732$ | $\gamma d_6 = 53.7$ |
| $R_{12} = 12.0$ | $d_{12} = 6.5$ | | |
| $R_0 = \infty$ | $d_0 = 1.2$ | $n_0 = 1.51743$ | Filter |
| $R_0 = \infty$ | $d_0 = 0.5$ | | |
| $R_{13} = 350.0$ | $d_{13} = 3.0$ | $n_7 = 1.83739$ | $\gamma d_7 = 43.5$ |
| $R_{14} = 12.08$ | $d_{14} = 12.3$ | $n_8 = 1.54072$ | $\gamma d_8 = 47.2$ |
| $R_{15} = −15.8$ | $d_{15} = 0.1$ | | |
| $R_{16} = 17.0$ | $d_{16} = 0.8$ | $n_9 = 1.6968$ | $\gamma d_9 = 55.6$ |
| $R_{17} = 7.45$ | $d_{17} = 1.7$ | | |
| $R_{18} = 11.9$ | $d_{18} = 2.8$ | $n_{10} = 1.59507$ | $\gamma d_{10} = 35.6$ |
| $R_{19} = −9.0$ | $d_{19} = 0.9$ | $n_{11} = 1.60311$ | $\gamma d_{11} = 60.7$ |
| $R_{20} = \infty$ | $d_{20} = 1.6$ | | |
| $R_{21} = \infty$ | $d_{21} = 4.1$ | $n_{12} = 1.59507$ | $\gamma d_{12} = 35.6$ |
| $R_{22} = −10.5$ | $d_{22} = 0.6$ | | |
| $R_{23} = −13.1$ | $d_{23} = 1.5$ | $n_{13} = 1.86074$ | $\gamma d_{13} = 23.1$ |
| $R_{24} = 35.4$ | $d_{24} = 0.65$ | | |
| $R_{25} = −41.0$ | $d_{25} = 2.2$ | $n_{14} = 1.44628$ | $\gamma d_{14} = 67.2$ |
| $R_{26} = −9.6$ | $d_{26} = 0.1$ | | |
| $R_{27} = 900.0$ | $d_{27} = 0.8$ | $n_{15} = 1.8663$ | $\gamma d_{15} = 37.9$ |
| $R_{28} = 30.7$ | $d_{28} = 5.7$ | $n_{16} = 1.48749$ | $\gamma d_{16} = 70.0$ |
| $R_{29} = −14.901$ | B.f. = 37.517 | | |

As has been disclosed above, the present invention provides a retrofocus type lens in which various aberrations, particularly distortion, astigmatism, spherical aberration and coma can be substantially corrected throughout an angle of view as wide as 118°, and in which marginal light up to 320 percent, as measured on the first tangential plane, can be introduced for the relative aperture of F/8.

I claim:

1. A retrofocus type ultra-wide angle lens system comprising 13 air-spaced elements in four groups, said four groups including, as viewed from the object side of the system, a first group consisting of two divergent meniscus elements and a convergent meniscus element, a second group consisting of three divergent meniscus elements and a convergent cemented component, a third group consisting of a divergent meniscus element and a positive cemented component, said third group being immediately followed by a diaphragm, and a fourth group consisting of a convergent element, a divergent element, a convergent element and a cemented convergent component.

2. A retrofocus type ultra-wide angle lens system comprising 13 air-spaced elements in four groups, said four groups including, as viewed from the object side of the system, a first group consisting of two divergent meniscus elements and a convergent meniscus element, a second group consisting of three divergent meniscus elements and a convergent cemented component, a third group consisting of a divergent meniscus element and a positive cemented component, said third group being immediately followed by a diaphragm, and a fourth group consisting of a convergent element, a divergent element, a convergent meniscus element and a cemented component, said lens system having the following characteristics:

Focal length $f = 13.2$mm, Relative Aperture $F/8$, Angle of view $118°$

| | | | |
|---|---|---|---|
| $R_1 = 57.2$ $d_1 = 3.9$ | $n_1 = 1.77279$ | $\gamma d_1 = 49.5$ |
| $R_2 = 43.0$ $d_2 = 11.9$ | | |
| $R_3 = 51.0$ $d_3 = 3.0$ | $n_2 = 1.7335$ | $\gamma d_2 = 51.0$ |
| $R_4 = 37.5$ $d_4 = 9.3$ | | |
| $R_5 = 48.2$ $d_5 = 13.5$ | $n_3 = 1.732$ | $\gamma d_3 = 53.7$ |
| $R_6 = 190.0$ $d_6 = 0.1$ | | |
| $R_7 = 28.5$ $d_7 = 1.2$ | $n_4 = 1.7335$ | $\gamma d_4 = 51.0$ |
| $R_8 = 17.6$ $d_8 = 3.3$ | | |
| $R_9 = 22.5$ $d_9 = 1.0$ | $n_5 = 1.7320$ | $\gamma d_5 = 53.7$ |
| $R_{10} = 13.2$ $d_{10} = 3.0$ | | |
| $R_{11} = 17.6$ $d_{11} = 1.0$ | $n_6 = 1.732$ | $\gamma d_6 = 53.7$ |
| $R_{12} = 12.0$ $d_{12} = 6.5$ | | |
| $R_0 = \infty$ $d_0 = 1.2$ | $n_0 = 1.51743$ | Filter |
| $R_0 = \infty$ $d_0 = 0.5$ | | |
| $R_{13} = 350.0$ $d_{13} = 3.0$ | $n_7 = 1.83739$ | $\gamma d_7 = 43.5$ |
| $R_{14} = 12.08$ $d_{14} = 12.3$ | $n_8 = 1.54072$ | $\gamma d_8 = 47.2$ |
| $R_{15} = -15.8$ $d_{15} = 0.1$ | | |
| $R_{16} = 17.0$ $d_{16} = 0.8$ | $n_9 = 1.6968$ | $\gamma d_9 = 55.6$ |
| $R_{17} = 7.45$ $d_{17} = 1.7$ | | |
| $R_{18} = 11.9$ $d_{18} = 2.8$ | $n_{10} = 1.59507$ | $\gamma d_{10} = 35.6$ |
| $R_{19} = -9.0$ $d_{19} = 0.9$ | $n_{11} = 1.60311$ | $\gamma d_{11} = 60.7$ |
| $R_{20} = \infty$ $d_{20} = 1.6$ | | |
| $R_{21} = \infty$ $d_{21} = 4.1$ | $n_{12} = 1.59507$ | $\gamma d_{12} = 35.6$ |
| $R_{22} = -10.5$ $d_{22} = 0.6$ | | |
| $R_{23} = -13.1$ $d_{23} = 1.5$ | $n_{13} = 1.86074$ | $\gamma d_{13} = 23.1$ |
| $R_{24} = 35.4$ $d_{24} = 0.65$ | | |
| $R_{25} = -41.0$ $d_{25} = 2.2$ | $n_{14} = 1.44628$ | $\gamma d_{14} = 67.2$ |
| $R_{26} = -9.6$ $d_{26} = 0.1$ | | |
| $R_{27} = 900.0$ $d_{27} = 0.8$ | $n_{15} = 1.8663$ | $\gamma d_{15} = 37.9$ |
| $R_{28} = 30.7$ $d_{28} = 5.7$ | $n_{16} = 1.48749$ | $\gamma d_{16} = 70.0$ |
| $R_{29} = -14.901$ B.f. $= 37.517$ | | | wherein, $R$ subscript denotes the radius of curvature of the surface of each element; $d$ subscript denotes the thickness of each element and the air space between adjacent elements; $n$ subscripts denotes the refractive index of each element; and $\gamma d$ subscripts denotes the Abbe number of each element.

* * * * *

UNITED STATES PATENT OFFICE
CERTIFICATE OF CORRECTION

Patent No. 3,728,011    Dated April 17, 1973

Inventor(s) KNUO MORI

It is certified that error appears in the above-identified patent and that said Letters Patent are hereby corrected as shown below:

Column 3, line 5, change "$3R_5<R_6<5<5$" to -- $3R_5<R_6<5R_5$ --; line 15, change "four" to -- three --; same line, after "$L_5$," insert -- and --; same line, change "$L_6$" to -- $L_6$, --; same line, before "$L_7$", insert -- one component --; line 16, change "element" to -- component --; line 18, change "elements" to -- element --; same line, after "and", insert -- component --; line 43, change "element" to -- component --.

Column 4, line 32, change "if: to -- is --; line 59, change "designated" to -- designed --; line 63, change "element" to -- component --.

Column 6, In the Example,
at "$R_0$" (second occurrence), change "$R_0 = \infty \ d_0 = 0.5$" to -- $R_0' = \infty \ d_0' = 0.5$ --.

Column 8, at "$R_0$" (second occurrence), change "$R_0 = \infty \ d_0 = 0.5$" to -- "$R_0' = \infty \ d_0' = 0.5$ --; At "$R_{15}$" change "$d_{14}$" to -- $d_{15}$ --.

Signed and sealed this 22nd day of January 1974.

(SEAL)
Attest:

EDWARD M. FLETCHER, JR.          RENE D. TEGTMEYER
Attesting Officer                Acting Commissioner of Patents